United States Patent
Karcher et al.

[11] 3,842,614
[45] Oct. 22, 1974

[54] CRYOGENIC COUPLING ASSEMBLY

[75] Inventors: Thomas D. Karcher, Rocky River; Harry H. Hammond, Middleburg Heights, both of Ohio

[73] Assignee: The Hansen Manufacturing Company, Cleveland, Ohio

[22] Filed: Oct. 12, 1973

[21] Appl. No.: 405,797

[52] U.S. Cl.................. 62/56, 62/299, 137/614.04, 285/312
[51] Int. Cl. ...................................................... F25d
[58] Field of Search ............ 137/614.04; 62/56, 299

[56] References Cited
UNITED STATES PATENTS

| | | | |
|---|---|---|---|
| 2,518,299 | 8/1950 | Fernandez | 62/299 |
| 3,131,905 | 5/1964 | Nyberg | 137/614.04 |
| 3,337,244 | 8/1967 | Appleberry | 137/614.04 |
| 3,537,478 | 11/1970 | Evans | 137/614.04 |

Primary Examiner—William J. Wye

[57] ABSTRACT

An improved method and apparatus for handling fluids at cryogenic temperatures in an environment in which ice forms on the apparatus includes the utilization of a coupling assembly which is manually releasable against the influence of the ice. This coupling assembly includes a socket having a wall with a plurality of openings through which locking elements extend to grip a plug when the coupling assembly is in the engaged condition. A second plurality of openings are interspersed with the openings through which the locking elements extend. These second openings are unrestricted by locking elements and receive ice formed during a flow of fluid at cryogenic temperatures through the engaged coupling. By receiving the ice, it is believed that the second openings enable the coupling to be manually actuated from the engaged condition to the released condition without heating the coupling to remove the ice.

7 Claims, 5 Drawing Figures

PATENTED OCT 22 1974    3,842,614
SHEET 1 OF 2

CRYOGENIC COUPLING ASSEMBLY

BACKGROUND OF THE INVENTION

This invention relates to an apparatus and method for handling fluids at cryogenic temperatures in an environment in which ice forms on the apparatus during the handling of the fluids.

It is a common practice to handle many different fluids at cryogenic temperatures, that is at temperatures below −150° C. The apparatus which is utilized to handle fluids at these low temperatures becomes very cold so that atmospheric vapor tends to condense on the apparatus and form ice. When a coupling is utilized to interconnect a pair of conduits which conduct fluids at cryogenic temperatures, the formation of ice tends to freeze together the elements of the coupling so that they cannot be readily released or disconnected without thawing the coupling. In an effort to eliminate the need for thawing the coupling before disconnecting it, it has been suggested that a cam action lever or handle may be used in the manner disclosed in U.S. Pat. No. 3,116,943.

SUMMARY OF THE INVENTION

The present invention provides a quick disconnect cryogenic coupling having ball type locking elements. Unrestricted openings are provided between adjacent locking elements to receive ice formed during the flow of cryogenic fluid through the connected coupling assembly. Although the exact mode of operation of the coupling is not known, it is believed that when the coupling is to be disconnected, the unrestricted openings between the locking elements or balls provide a space for broken or scraped off ice to facilitate operation of the coupling to the disconnected condition. When a coupling having these openings is to be disconnected, it is merely necessary to manually retract a locking sleeve and pull the coupling apart. This is readily accomplished against the influence of the ice formed on the coupling without heating the coupling.

Accordingly, it is an object of this invention to provide a new and improved method and apparatus for handling fluids at cryogenic temperatures in an environment in which ice forms on the apparatus during the handling of fluids and wherein a coupling is manually actuatable from an engaged condition to a disengaged condition against the influence of ice formed on the coupling without heating the coupling.

Another object of this invention is to provide a new and improved apparatus for handling fluids at cryogenic temperatures in an environment in which ice forms on the apparatus during the handling of the fluids and wherein the apparatus includes a coupling having a plurality of locking elements with unrestricted openings disposed between the locking elements to receive ice formed when the coupling is in an engaged condition to enable the coupling to be manually released against the influence of the ice.

Another object of this invention is to provide a new and improved method of handling fluids at cryogenic temperatures in an environment in which ice forms on the apparatus utilized to handle the fluids and wherein the method includes the step of manually disconnecting the socket assembly against the influence of ice formed thereon while allowing the ice to move into a plurality of unrestricted openings in the coupling.

BRIEF DESCRIPTION OF THE DRAWINGS

The foregoing and other objects and features of the present invention will become more apparent upon a consideration of the following description taken in connection with the drawings wherein.

DESCRIPTION OF ONE PREFERRED EMBODIMENT OF THE INVENTION

Figure 1:
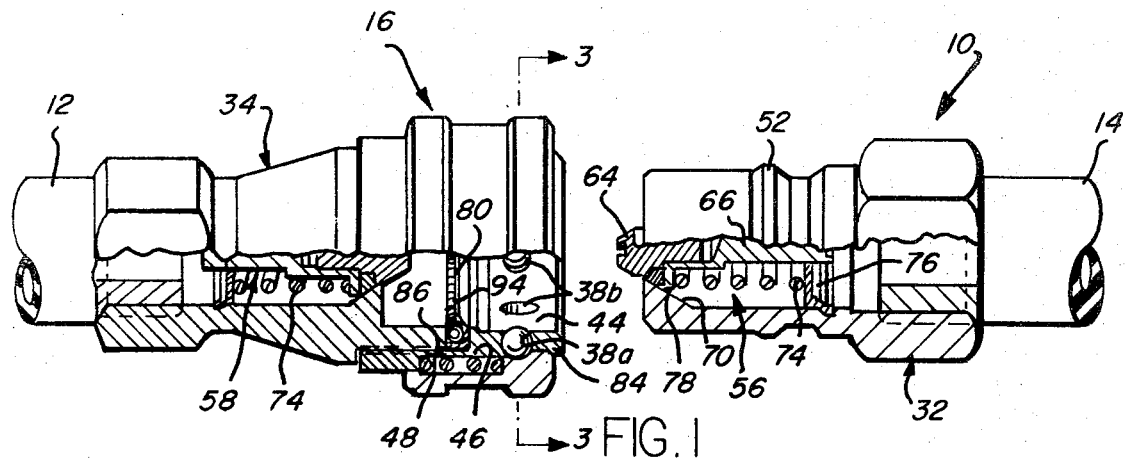
FIG. 1 is a partially broken away illustration of a coupling assembly constructed in accordance with the present invention, the coupling assembly being shown in a disconnected condition.

An apparatus for handling fluids a cryogenic temperatures, that is at temperatures wich are less than −150° C, in an environment in which ice is formed on the apparatus during the handling of the fluid is illustrated in FIG. 1. The apparatus includes a pair of conduits 12 and 14 which are connected in fluid communication with each other when the coupling assembly 16 is actuated from the disengaged condition of FIG. 1 to the engaged condition of FIG. 2. During a flow of cryogenic fluid from the conduit 12 to the conduit 14 with the coupling assembly 16 in the engaged condition, it is contemplated that ice, indicated schematically at 20 in FIG. 2, will form on the coupling assembly. The ice results from the condensation and freezing of vapor from the atmosphere to which the coupling is exposed. Although this ice forms around locking elements or balls 24, the coupling 16 can be actuated from an engaged condition of FIG. 2 to the disengaged condition of FIG. 1 by merely retracting a cylindrical locking sleeve 28 to release the locking balls 24 and pulling a plug 32 and socket 34 axially apart.

Figure 3:
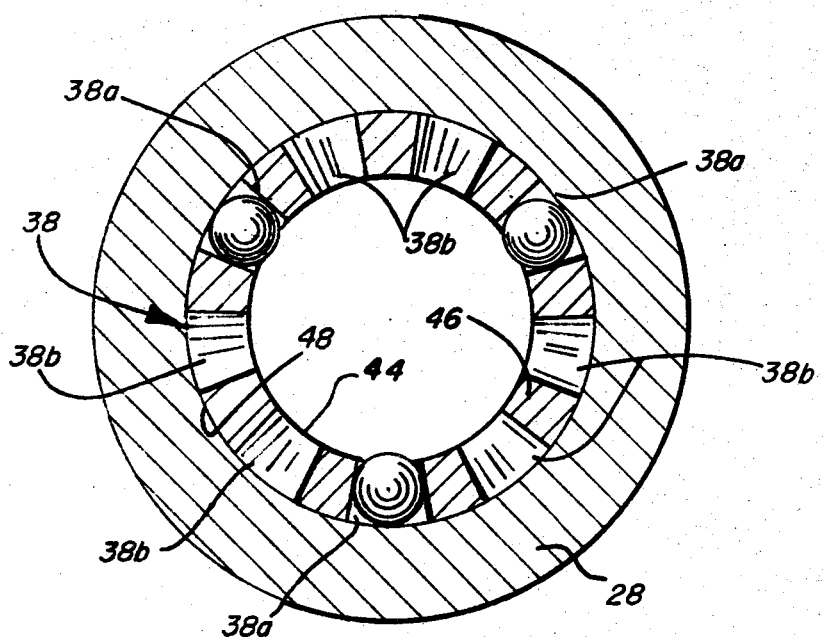
FIG. 3 is an enlarged sectional view, taken generally along the line 3—3 of FIG. 1, illustrating the relationship between a plurality of locking elements and openings formed in the socket of the coupling assembly.

The general construction and mode of operation of the coupling 16 is generally similar to that disclosed in U.S. Pat. No. 2,548,528. However, the coupling 16 is provided with more openings 38 for receiving the locking balls 24 than there are locking balls (FIG. 3). The locking balls 24 are disposed in openings 38a. Unrestricted openings 38b are disposed adjacent to each side of the locking balls 24. Although it is contemplated that the circular openings 38b between the locking balls 24 could have any desired configuration, the openings 38b which are not associated with locking balls 24 are of the same configuration as the openings 38a.

Figure 2:
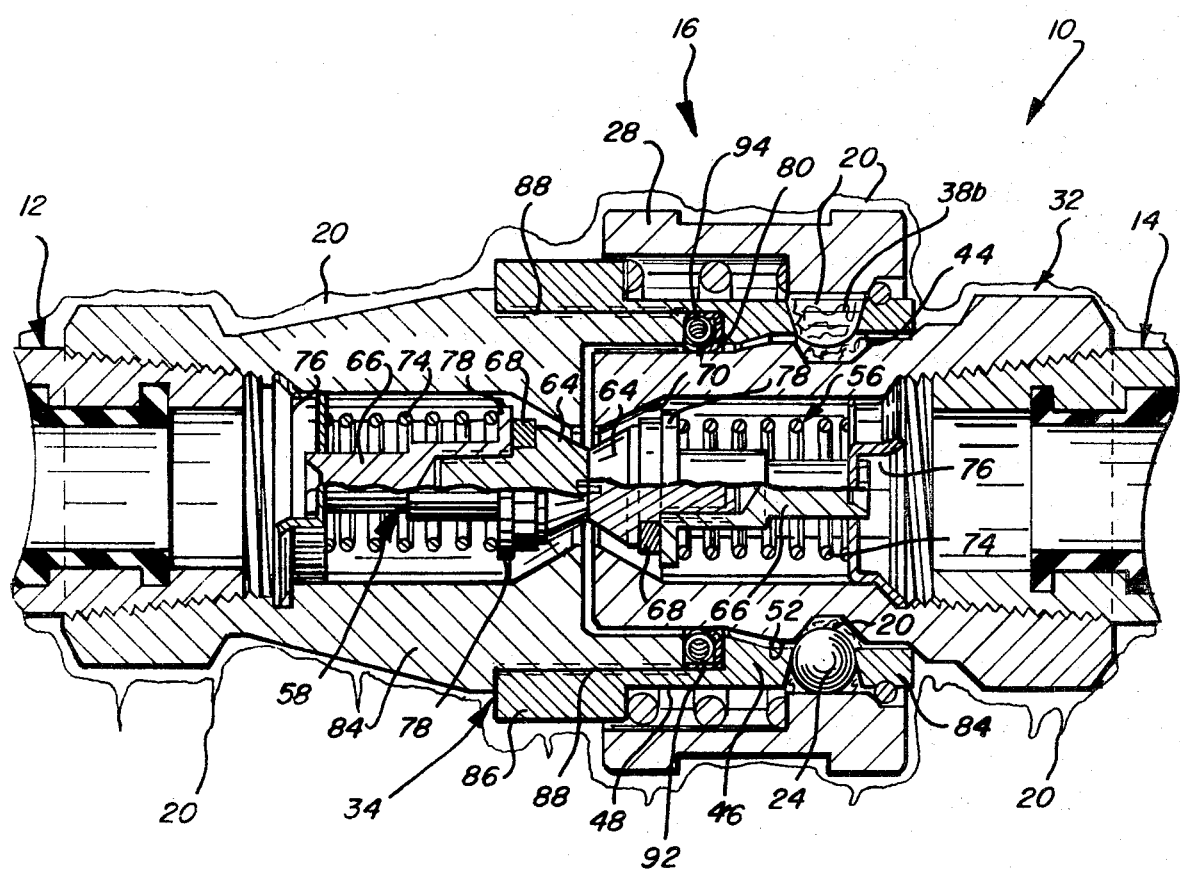
FIG. 2 is an enlarged sectional view illustrating the coupling assembly of FIG. 1 in a connected condition.
Figure 4:
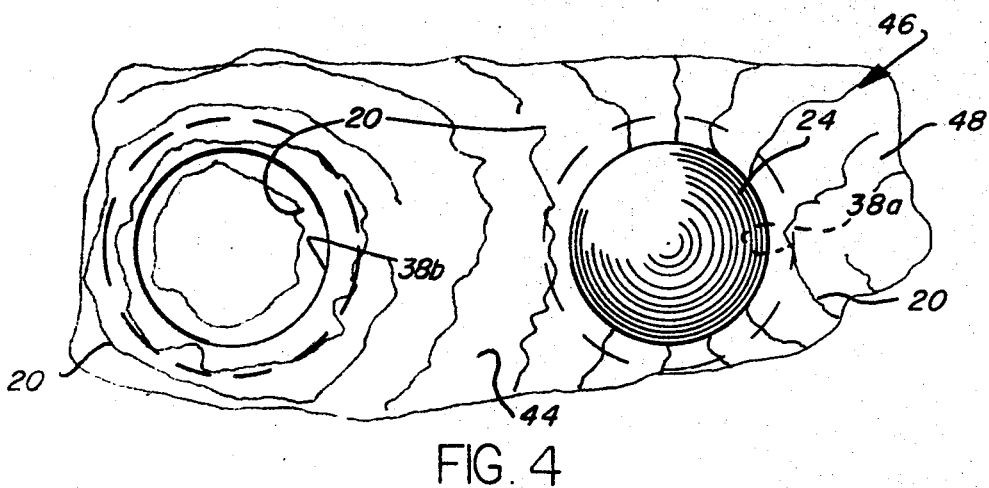
FIG. 4 is an enlarged illustration schematically depicting the relationship between a locking element or ball, an adjacent opening or hole in the socket, and ice formed during the flow or cryogenic fluids through the coupling assembly when it is in the engaged condition of FIG. 2.
Figure 5:
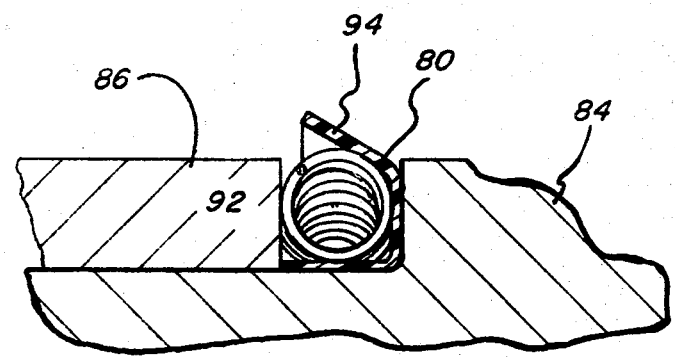
FIG. 5 is an enlarged sectional view of a seal disposed in the socket of the coupling assembly.

Although it is not known exactly how the ice 20 is displaced when the coupling 16 is to be operated from the engaged condition of FIG. 2 to the disengaged condition of FIG. 1, it is theorized that the ice is forced into the empty openings 38b. Thus, it is believed that as cryogenic fluids are being conducted through the engaged coupling 16 (see FIG. 2), ice forms between the outer surface of the plug element 32 and an inner surface 44 of a cylindrical socket wall 46. This ice extends over a cylindrical outer surface 48 of the socket wall 46 and encrusts the locking balls 24. In addition, the ice forms around the periphery of the empty openings 38b in the manner illustrated schematically in FIG. 4. However, the ice does not completely fill the empty openings 38b.

When the cylindrical latch sleeve 28 is manually retracted, it is believed that the ice which is broken loose moves into the empty openings 38b. When the plug 32 and socket 34 are axially pulled apart, an annular cam ring 52 (FIG. 1) on the plug forces the locking balls 24 radially outwardly in the associated openings 38a. It is believed that as this occurs the ice is further displaced into the empty openings 38b to prevent binding up of the coupling 16 under the influence of the ice.

Although applicants are not exactly sure how the ice cooperates with the unrestricted openings 38b to enable the coupling 16 to be manually released without heating the coupling to thaw the ice, it has been determined by experimentation that if a locking ball is provided in each of the openings 38, the coupling cannot be manually released without first heating the coupling. Thus, a coupling having a locking ball in each of the openings 38, that is a total of nine locking balls in the nine openings, was utilized to conduct fluids at cryogenic temperatures. The vapor from the atmosphere condensed on this nine-ball coupling. When it was attempted to manually release the coupling by pulling the sleeve 28 back, it was found that the coupling could not be released. The only way in which the nine-ball coupling could be released was by heating it to thaw the ice which formed on the coupling.

After the unsatisfactory attempt to utilize a nine-ball coupling, six of the locking balls were removed to form the coupling 16 (FIG. 3). This coupling was utilized to conduct cryogenic fluids in the same manner as was previously done with the nine-ball coupling. Ice formed on the coupling 16 in the same manner as in which it had previously been formed on the nine-ball coupling. When the sleeve 28 of the coupling 16 was manually retracted, the plug 32 and socket 34 could be manually pulled axially apart without heating the coupling to thaw the ice. It is believed that the provision of the empty openings 38b between the locking balls 24 enabled the ice to be displaced into these openings to prevent a binding up of the coupling 16.

Valves 56 and 58 (FIG. 2) are provided in the plug and sockets 32 and 34 to block fluid flow through the conduits 12 and 14 when the coupling 16 is in the disconnected condition of FIG. 1. The valve 56 in the plug 32 includes a brass nose portion 64 which is threadably received in a brass body 66. An annular seal formed of polytetrafluoroethylene or similar material, for example, "Teflon," is pressed against a frustro-conical inner surface 70 of the plug 32 under the influence of the spring 74. The spring 74 extends between a valve guide spider 76 and an annular backing plate 78 formed on the outer end portion of the stem 66. The valve stem 66 is movable axially relative to the spider 76 to enable the spring 74 to press the seal 68 into tight sealing engagement with the valve seat 70.

The generally frustro-conical nose portion 64 guides movement of the seal 68 into tight sealing engagement with valve seat 70. In addition, the backing plate 78 provides a metal to metal seal or seat stop to prevent overloading of the seal. Since the seal ring 68 is disposed between the nose 64 and backing seat 78, it can be pre-squeezed or compressed to promote the formation of a tight seal under cryogenic conditions.

The valve 58 is of the same construction as the valve 56 and will not be further described herein in order to avoid prolixity of description. However, it should be noted that the two valves 56 and 58 cooperate with the plug and socket 32 and 34 to block the flow of fluid at cryogenic temperatures when the coupling 16 is disconnected.

An annular seal ring is disposed in the socket wall 46 between a cylindrical outer section 84 and a crylindrical inner section 86 of the socket wall 46. The inner and outer sections 84 and 86 of the socket wall 46 are threadably interconnected at 88 (see FIG. 1) to form a unitary socket wall. The seal 80 includes an annular spring 92 which is disposed within an annular covering 94 having a generally U-shaped radial cross section. The covering 94 is formed of polytetrafluoroethylene or similar material and engages the outer surface of the plug 32 to prevent leakage of fluids between the plug and socket wall when the coupling is engaged (see FIG. 2).

In view of the foregoing description it is apparent that the coupling assembly 16 is particularly well suited to handling fluids at cryogenic temperatures in an environment in which ice forms on the coupling assembly. The coupling assembly 16 is manually releasable against the influence of the ice and includes a socket 34 having a wall 46 with a plurality of openings 38a through which locking elements 24 extend to grip a plug 32 when the coupling assembly is in the engaged condition of FIG. 1. A second plurality of openings 38b are interspersed with the openings 38a through which the locking elements extend. These second openings 38b are unrestricted by locking elements or balls 24 and receive ice formed during a flow of fluid at cryogenic temperatures through the engaged coupling. By receiving the ice, it is believed that the second openings 38b enable the coupling to be manually actuated from the engaged condition to the released condition without heating the coupling to remove the ice.

Having described a specific preferred embodiment of the invention, the following is claimed:

1. An apparatus for use in handling fluids at cryogenic temperatures in an environment in which ice forms on the apparatus during the handling of the fluids, said apparatus comprising first conduit means for conducting fluids at cryogenic temperatures, second conduit means for conducting fluids at cryogenic temperatures, and coupling means for connecting said first and second conduit means in fluid communication, said coupling means being operable manually against the influence of the ice formed thereon from an engaged condition interconnecting said first and second conduit means to a disengaged condition in which said coupling means is ineffective to interconnect said first and second conduit means, said coupling means including a plug element having an axially extending passage for conducting fluid at cryogenic temperatures and socket means for receiving said plug element, said socket means including a socket wall which at least partially defines an axially extending cavity for receiving said plug element, first surface means for defining a first plurality of openings extending through said socket wall into said cavity, said first plurality of openings being disposed in a generally circular array about said socket wall and having central axes extending transversely to the central axis of said cavity, a plurality of locking elements disposed on said socket wall, each of said locking elements being associated with one of said first plurality of openings and movable between a release position and a retaining position extending through the associated one of said openings into engagement with said plug element to hold said plug element against axial movement relative to said socket means, and second surface means for defining a second plurality of openings extending through said socket wall into said cavity to receive ice formed when said coupling means is in the engaged condition, said second plurality of openings being interspersed with said first plurality of openings and being unrestricted by said locking elements to enable said second openings to receive ice formed during the flow of fluid at cryogenic temperatures through said coupling means and to enable said coupling means to be manually actuated from the engaged condition to the release condition against the influence of the ice.

2. An apparatus as set forth in claim 1 wherein each opening of said first and second plurality of openings has the same configuration.

3. An apparatus as set forth in claim 1 wherein said socket means includes sleeve means movable manually along said socket wall against the influence of ice formed when said coupling means is in the engaged condition, said sleeve means being movable manually between a first position holding said locking elements in the retaining position and a second position in which locking elements are free to move toward the release position against the influence of the ice, said plug element including surface means for forcing said locking elements toward the release position and contemporaneously therewith effecting movement of ice formed while said coupling means is in the engaged condition into said second plurality of openings.

4. An apparatus as set forth in claim 1 wherein said second plurality of openings includes a first opening disposed adjacent to one side of one of said first plurality of openings and a second opening disposed adjacent to another side of said one of said openings.

5. An apparatus as set forth in claim 1 wherein said socket means includes valve means for blocking a flow of fluids at cryogenic temperatures when said coupling means is in the disengaged condition.

6. A method of handling fluids at cryogenic temperatures in an environment in which ice forms on apparatus utilized to handle the fluids, said method comprising the steps of providing a plug element connected with a first conduit, providing a socket assembly connected with a second conduit and having a first plurality of socket wall openings through which locking elements are extendable to engage the plug element and a second plurality of openings which are unrestricted by locking elements, said socket assembly including a sleeve member movable axially between an engaged position holding said locking elements in engagement with said plug element and a release position in which said locking elements are free to move out of engagement with said plug element, connecting said first and second conduits in fluid communication by inserting said plug element into said socket assembly with said sleeve member in the release position and thereafter moving said sleeve member to the engaged position to hold said locking elements in engagement with said plug element, flowing fluids at cryogenic temperatures through the first and second conduits, plug element, and socket assembly, allowing ice to form on the socket assembly during the flow of fluids through the socket assembly at cryogenic temperatures, and manually disconnecting the first and second conduits by manually moving the sleeve against the influence of the ice formed on the socket assembly, said step of manually disconnecting the first and second conduits includes the step of allowing ice formed on the socket assembly during the flow of cryogenic fluid through the socket assembly to move into the second plurality of openings.

7. A method as set forth in claim 6 wherein said step of manually disconnecting the first and second conduits includes the step of operating a valve in the socket assembly to a closed position to block fluid flow through the socket assembly.

* * * * *